United States Patent
Aubert et al.

(10) Patent No.: US 12,459,822 B2
(45) Date of Patent: Nov. 4, 2025

(54) METHOD FOR PREPARING A POROUS CARBONACEOUS SUBSTRATE HAVING CARBON NANOTUBES ON ITS SURFACE AND ITS BODY

(71) Applicants: Nawatechnologies, Aix en Provence (FR); COMMISSARIAT À L'ÉNERGIE ATOMIQUE ET AUX ÉNERGIES ALTERNATIVES, Paris (FR); CY CERGY PARIS UNIVERSITÉ, Cergy-Pontoise (FR); UNIVERSITE DE TOURS, Tours (FR)

(72) Inventors: Pierre-Henri Aubert, Osny (FR); Philippe Banet, Acheres (FR); Aurélien Boisset, Gardanne (FR); Léa Darchy, Greasque (FR); Jérémie Descarpentries, Gif sur Yvette (FR); Fouad Ghamouss, Joues les Tours (FR); Harald Hauf, La Seyne sur Mer (FR); Martine Mayne, Les Molieres (FR); Mathieu Pinault, Les Molieres (FR); François Tran Van, Fresnes (FR)

(73) Assignees: NAWATECHNOLOGIES, Aix en Provence (FR); CY CERGY PARIS UNIVERSITÉ, Cergy-Pontoise (FR); COMMISSARIAT À L'ENERGIE ATOMIQUE ET AUX ÉNERGIES ALTERNATIVES, Paris (FR); UNIVERSITE DE TOURS, Tours (FR)

( * ) Notice: Subject to any disclaimer, the term of this patent is extended or adjusted under 35 U.S.C. 154(b) by 1124 days.

(21) Appl. No.: 17/269,082

(22) PCT Filed: Aug. 20, 2019

(86) PCT No.: PCT/FR2019/051941
§ 371 (c)(1),
(2) Date: Feb. 17, 2021

(87) PCT Pub. No.: WO2020/039145
PCT Pub. Date: Feb. 27, 2020

(65) Prior Publication Data
US 2021/0171350 A1    Jun. 10, 2021

(30) Foreign Application Priority Data
Aug. 21, 2018  (FR) ..................................... 1857575

(51) Int. Cl.
| | |
|---|---|
| C01B 32/162 | (2017.01) |
| C01B 32/168 | (2017.01) |
| H01G 11/36 | (2013.01) |
| H01G 11/86 | (2013.01) |
| H01M 4/04 | (2006.01) |
| H01M 4/133 | (2010.01) |
| H01M 4/583 | (2010.01) |
| H01M 4/62 | (2006.01) |

(Continued)

(52) U.S. Cl.
CPC .......... *C01B 32/162* (2017.08); *C01B 32/168* (2017.08); *H01G 11/36* (2013.01); *H01G 11/86* (2013.01); *H01M 4/0428* (2013.01); *H01M 4/133* (2013.01); *H01M 4/583* (2013.01); *H01M 4/624* (2013.01); *B82Y 30/00* (2013.01); *B82Y 40/00* (2013.01); *C01B 2202/08* (2013.01); *C01B 2202/22* (2013.01); *C01P 2004/03* (2013.01)

(58) Field of Classification Search
CPC ... C01B 32/162; C01B 32/168; C01B 32/182; C01B 2202/08
See application file for complete search history.

(56) References Cited

U.S. PATENT DOCUMENTS

| | | | | |
|---|---|---|---|---|
| 9,731,277 | B2 * | 8/2017 | Chan | ........................ B01J 23/75 |
| 9,878,912 | B2 * | 1/2018 | Malaibari | ............... C23C 16/26 |
| 2003/0077515 | A1 | 4/2003 | Chen et al. | |

(Continued)

FOREIGN PATENT DOCUMENTS

| | | |
|---|---|---|
| CN | 102354612 A | 2/2012 |
| EP | 1966286 A2 | 9/2008 |

(Continued)

OTHER PUBLICATIONS

Lv, Peng, et al., "Vertically aligned carbon nanotubes grown on carbon fabric with high rate capability for super-capacitors". Synthetic Metals 162 (2012) 1090-1096.*

Zhang, Qiang, et al., "Vertically aligned carbon nanotube arrays grown on a lamellar catalyst by fluidized bed catalytic chemical vapor deposition". Carbon 47 (2009) 2600-2610.*

Deng, Weina, et al., "Sulfur-impregnated 3D hierarchical porous nitrogen-doped aligned carbon nanotubes as high-performance cathode for lithium-sulfur batteries". Journal of Power Sources 322 (2016) 138-146.*

(Continued)

*Primary Examiner* — Bret P Chen
(74) *Attorney, Agent, or Firm* — Chrisman Gallo Tochtrop LLC

(57) ABSTRACT

A method for providing a substrate made of a porous carbonaceous material with vertically aligned carbon nanotubes, the method having a first step of depositing a ceramic underlayer on the substrate followed by a second step of synthesizing, by catalytic chemical vapour deposition, the vertically aligned carbon nanotubes on the substrate obtained after the first step, the carbon source necessary for the synthesis during this second step being injected in a direction substantially perpendicular to the plane of the substrate and at a pressure less than 8104 Pa (800 mbar). The use of the substrate for preparing an electrode such as a supercapacitor electrode.

13 Claims, 4 Drawing Sheets

(51) Int. Cl.
 *B82Y 30/00* (2011.01)
 *B82Y 40/00* (2011.01)

(56) References Cited

U.S. PATENT DOCUMENTS

| | | | | |
|---|---|---|---|---|
| 2011/0062410 | A1* | 3/2011 | Ivanov | H10K 30/152 |
| | | | | 257/E51.012 |
| 2011/0318256 | A1* | 12/2011 | Nakayama | B82Y 30/00 |
| | | | | 977/843 |
| 2014/0286852 | A1* | 9/2014 | Nicholas | C01B 32/176 |
| | | | | 204/173 |
| 2016/0289826 | A1* | 10/2016 | Boulanger | B01J 19/1862 |
| 2017/0101317 | A1* | 4/2017 | Malaibari | C01B 32/16 |
| 2020/0067096 | A1 | 2/2020 | Aubert et al. | |
| 2020/0227212 | A1 | 7/2020 | Pinault et al. | |
| 2020/0286690 | A1 | 9/2020 | Pinault et al. | |

FOREIGN PATENT DOCUMENTS

| | | | | |
|---|---|---|---|---|
| WO | WO-2005-007926 | † | 1/2005 | |
| WO | 2008016990 A2 | | 2/2008 | |
| WO | 20090103925 A2 | | 8/2009 | |
| WO | WO-2011-138595 | † | 11/2011 | |
| WO | 2012004317 A1 | | 1/2012 | |
| WO | 2015071408 A1 | | 5/2015 | |
| WO | WO-2015-082936 | † | 6/2015 | |
| WO | WO-2016-087857 | † | 6/2016 | |
| WO | WO 2017/191415 A1 * | | 11/2017 | C25D 5/54 |
| WO | WO-2018-134245 | † | 7/2018 | |
| WO | WO-2018158543 A1 * | | 9/2018 | C01B 32/162 |

OTHER PUBLICATIONS

Zhang, Guanhua, et al., "Radially Aligned Porous Carbon Nanotube Arrays on Carbon Fibers: A Hierarchical 3D Carbon Nanostructure for High-Performance Capacitive Energy Storage". Advance Functional Materials, 2016, 26, 3012-3020.*
Aguiló-Aguayo, Noemi, et al., "New Three-Dimensional Porous Electrode Concept: Vertically-Aligned Carbon Nanotubes Directly Grown on Embroidered Copper Structures".*
Meshot, Eric R., et al., "Engineering Vertically Aligned Carbon Nanotube Growth by Decoupled Thermal Treatment of Precursor and Catalyst" ACS Nano, vol. 3, No. 9 (2009) 2477-2486.*
Youn, Seul Ki, et al., "Temperature gradient chemical vapor deposition of vertically aligned carbon nanotubes". Carbon, vol. 42, Apr. 2013, pp. 343-352.*
Maruyama, Takahiro, et al., "Vertically aligned growth of small-diameter single-walled carbon nanotubes by alcohol catalytic chemical vapor deposition with Ir catalyst". Applied Surface Science, 509 (2020) 145340, pp. 1-8.*
International Search Report for PCT/FR2019/051941 dated Dec. 12, 2019 and translation thereof.
Written Opinion for PCT/FR2019/051941 dated Dec. 12, 2019.
Search Report for French application No. FR1857575 dated Jun. 5, 2019.

Faraji, Shaghayegh et al., "Modifying the morphology and properties of aligned CNT foams through secondary CNT growth", Nanotechnology, IOP, Bristol, GB, vol. 29, No. 29, May 16, 2018, p. 295602.
Feng, An et al., "Preparation of vertically aligned carbon nanotube arrays grown onto carbon fiber fabric and evaluating its wettability on effect of composite", Applied Surface Science, Elsevier, Amsterdam, NL, vol. 258, No. 3, Sep. 1, 2011, pp. 1069-1076.
Lv, Peng et al., "Vertically aligned carbon nanotubes grown on carbon fabric with high rate capability for super-capacitors", In: Elsevier, Synthetic Metals Apr. 2012, vol. 162, No. 13, pp. 1090-1096.
Worsley, Marcus A. et al., "High surface area carbon aerogels as porous substrates for direct growth of carbon nanotubes", Chemical Communications, vol. 46, No. 48, Jan. 1, 2010, pp. 9253-9255.
Murakami, Yoichi et al., "Growth of vertically aligned single-walled carbon nanotube films on quartz substrates and their optical anisotropy", Chemical Physics Letters, Elsevier BV, NL; vol. 385, No. 3-4, Feb. 9, 2004, pp. 298-303.
Warren, Rosemary et al., "Electrochemically synthesized and vertically aligned carbon nanotube-polypyrrole nanolayers for high energy storage devices", Sensors and Actuators A:Physical, vol. 231, Jul. 1, 2015, pp. 65-73.
Ma, Jun et al., "Asymmetric hybrid capacitors based on novel bearded carbon fiber cloth—pinhole polyaniline electrodes with excellent energy density" IN: RSC Adv., 2016, vol. 6, pp. 82995-83002.
Zhao, Xin et al., "Vapor-phase polymerization of poly(3,4-ethylenedioxythiophene) nanofibers on carbon cloth as electrodes for flexible supercapacitors" IN: Nanotechnology, 2016, vol. 27, pp. 1-11.
Ye, Zhiguo et al., "Morphology controlled MnO2 electrodeposited on carbon fiber paper for high-performance supercapacitors" IN: J. Power Sources, 2017, vol. 351, pp. 51-57.
Hsu et al., 2012, « High-cell-voltage supercapacitor of carbon nanotube/carbon cloth operating in neutral aqueous solution », Journal of Materials Chemistry, vol. 22, pp. 3383-3387. Please note that there is a typographical error in the publication date and in the name of the Journal as mentioned in the list of references.
Hiremath, Nitilaksha et al., "Recent developments in carbon fibers and carbon nanotube-based fibers: a review" IN: Polymer Reviews, Apr. 20, 2016, vol. 57, pp. 1-30.
Pozegic, T.R. et al, Multi-functionnal carbon fibre composites using carbon nanotubes as an alternative to polymer sizing:, IN: Scientific Reports, Nov. 23, 206, vol. 6, Article No. 37334.
Li, Yang et al. "Polyaniline/carbon nanotubes-decorated activated carbon fiber felt as high-performance, free-standing and flexible supercapacitor electrodes" IN: J. Mater. Sci., Jul. 7, 2017, vol. 52, pp. 12348-12357.
Yesi, Yesi et al., "Directly-grown hierarchical carbon nanotube polypyrrole core-shell hybrid for high-performance flexible supercapacitors" IN: Chem Sus Chem, 2016, vol. 9, pp. 370-378.

\* cited by examiner
† cited by third party

FIG.2A          FIG.2B
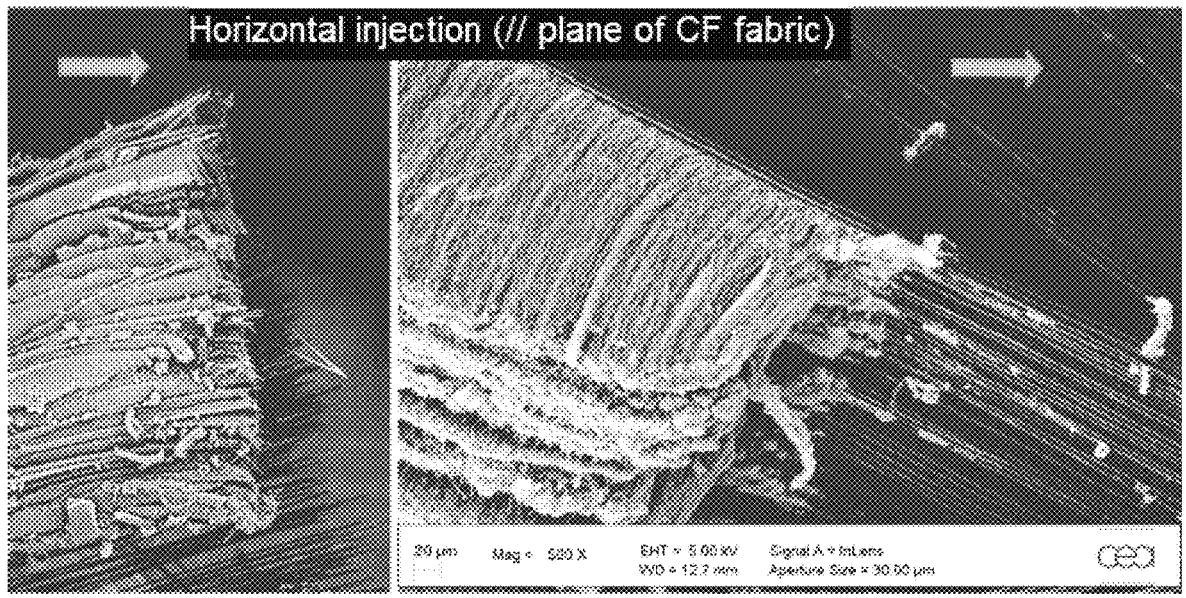
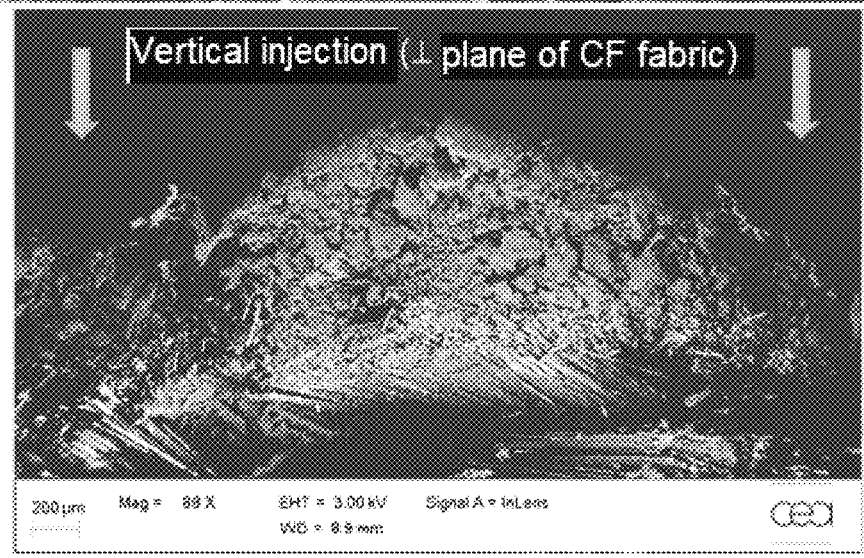
FIG.2C

METHOD FOR PREPARING A POROUS CARBONACEOUS SUBSTRATE HAVING CARBON NANOTUBES ON ITS SURFACE AND ITS BODY

CROSS-REFERENCE TO RELATED APPLICATIONS

This is a National Stage application of PCT international application PCT/FR2019/051941, filed on Aug. 20, 2019, which claims the priority of French Patent Application No. 1857574, filed Aug. 21, 2018, both of which are incorporated herein by reference in their entirety.

TECHNICAL FIELD

The present invention belongs to the field of devices for storing and restoring electrical energy and, in particular, to the field of electrodes particularly useful for supercapacitors.

More particularly, the present invention proposes an electrode having (i) a substrate made of a porous carbonaceous material, (ii) vertically aligned carbon nanotubes (VACNTs) on said substrate and in the body of said substrate and (iii) an electrically conducting organic polymer.

For this purpose, the present invention relates, firstly, to a method for synthesising vertically aligned carbon nanotubes (VACNTs) by chemical vapour deposition (CVD) on the surface and in the body of a porous carbonaceous substrate. The present invention relates to the composite material thus obtained and the uses thereof particularly for preparing an electrode as previously described.

Prior Art

To enable the development of renewable energies and the reduction of gas emissions, electricity storage is one of the major challenges to be met. Among the numerous autonomous sources, supercapacitors, based on rapid ion charge/discharge cycles on carbonaceous surfaces, are situated between capacitors and batteries. The high storage efficiency thereof (>95%), the safety thereof, the reliability thereof and the service life thereof make them good candidates for supplementing or replacing existing solutions such as, for example, electrochemical batteries, flywheels or magnetic storage.

Supercapacitors, the market of which is currently booming, have two electrodes, i.e. an anode and a cathode which are electrically insulated by a separator, an electrolyte being disposed between each electrode and the separator.

One of the important parameters for a supercapacitor is the capacitance of the system which, by way of reminder, is defined as the property of an electrical conductor of containing a certain level of electric charge for a determined electrical potential. The latter is essentially dependent on the correlation between the materials selected for the electrodes, the design of these electrodes and the electrolyte.

Among all of the materials studied, in particular, any porous carbonaceous material having an electrical conductivity adapted to the use thereof as a supercapacitor electrode can be envisaged both as an active material and as a current collector. For example, fabrics consisting of carbon fibres are materials which meet these requirements.

The use of carbon fibre fabrics as supercapacitor electrodes is widely studied and consists of combining the carbon fibre fabric with a pseudocapacitive material including electrically conducting polymers (ECPs), essentially polyaniline and polypyrrole (PPY). Thus, we can particularly cite the works of Ma et al who deposit PPY electrochemically on the surface of carbon fibre fabrics which gives the electrode a high capacitance: 3300 $mF/cm^2$ at 10 m V/s in sulphuric acid ($H_2SO_4$) (between 0 and 1.6 V) [1]. Further deposition techniques are also implemented such as vapour phase polymerisation of poly(3,4-ethylenedioxythiophene) (PEDOT) on carbon fibre fabrics giving the electrode advantageous energy and power densities [2]. Besides the association between carbon fibre fabrics and conducting polymers, metal oxides such as, for example manganese oxide ($MnO_2$), have also been associated with carbon fibre fabric by anodic electrodeposition giving the electrode an advantageous cyclability in sodium sulphate ($Na_2SO_4$) [3].

The integration of carbon nanostructures, particularly carbon nanotubes (CNTs), on the surface of the carbon fibre fabric has also been the subject of numerous works both for applications to structural materials or to multifunctional materials and for applications to energy storage. In the latter case, this integration makes it possible to give the electrode a controlled nanometric porosity, a greater specific surface area and an electrical conductivity which have beneficial impacts on the performances of the electrode [4]. The integration of carbon nanotubes on the surface of carbon fibre fabric can be carried out in different ways: either by depositing a nanotube suspension on the surface of the carbon fibre fabric, or by growing the nanotubes directly on carbon fibre fabric by chemical vapour deposition (CVD) [5,6].

The direct growth process by chemical vapour deposition (CVD) of CNTs is of interest in terms of simplicity of preparation and of intimate cohesion for the association between the carbon fibre fabric and the nanotubes. Let us cite particularly the works of Lv et al which focused on the growth of vertically aligned nanotubes on carbon fibre fabrics for applications to energy storage in supercapacitors [7]. These works demonstrate the control of the charging with CNTs by the synthesis time which acts upon the length of the CNTs, given that the CNTs are essentially distributed on the surface of the fabric. This material has properties that are advantageous in terms of cyclability in aqueous medium and competitive with respect to commercial carbonaceous systems. The authors explain that these properties are linked with a particular hierarchical 3D architecture having large mesopore sizes and channels in the aligned CNT array facilitating the diffusion of the electrolyte ions.

International application WO 2009/103925 proposes a method for growing VACNTs on carbonaceous substrates such as carbon fibres or metallic substrates in the same single growth reactor [8]. This method comprises a first phase of depositing a ceramic sublayer followed by a second phase of depositing carbon nanotubes on said sublayer. It is clear from the organisation of the different elements of the device used for this method and represented in FIG. 15 of [8] that pulverised precursors are injected in parallel with the substrate plane. This is referred to as "horizontal configuration" injection. Moreover, even if it is envisaged that the second step of the method can be carried out at a pressure less than atmospheric pressure, it is a pressure between 900 mbar ($9.10^4$ Pa) and 1000 mbar ($10^5$ Pa) which is used for this step in [8].

International application WO 2015/071408 relates to a method for continuously manufacturing aligned nanostructures such as VACNTs on a substrate by catalytic chemical vapour deposition [9]. In this application, it is also envisaged that the method used has the two steps as described in [8], the deposition of the ceramic sublayer being carried out in a pre-treatment chamber. In international application WO 2015/071408 [9], the pulverised precursors used during the deposition of the nanostructures are injected along a direction essentially perpendicular and preferably perpendicular to the conveying means. In other words, the direction of injection is essentially perpendicular to the substrate plane. As for [8], it is envisaged, in [9], that the pressure during VACNT growth can be less than atmospheric pressure. However, this step is carried out at a pressure between 900 mbar ($9.10^4$ Pa) and 1000 mbar ($10^5$ Pa). Moreover, a porous carbonaceous substrate is in no way described as usable in [9] (see from page 24, line 27 to page 25, line 4), all the examples carried out using a quartz substrate.

The above architectures including a carbon fibre fabric coated with randomly distributed or vertically aligned nanotubes can be the subject of substrates for depositing pseudocapacitive materials as mentioned above. Accordingly, two ways of preparing these materials are reported in the literature, namely: either the CNTs are deposited initially on the surface of the fibres then the pseudocapacitive material is deposited, or the pseudocapacitive material is initially deposited on the surface of the fibres then the CNTs are deposited. Most of the works incorporating this approach use nanotubes randomly distributed on the surface of the carbon fibre fabrics and sometimes even graphene. Let us cite particularly the works of Li and Chen who report studies on adding CNTs on fabric previously coated with polyaniline thus disclosing a flexible electrode having a high capacitance of 5611 $mF/cm^2$ at 1 mV/s and 3381 $mF/cm^2$ at 20 mV/s in an aqueous electrolytic medium ($H_2SO_4$) [10]. Yesi et al conducted studies on the growth of nanotubes randomly distributed on carbon fibre fabrics followed by the deposition of polypyrrole at 1430 $mF/cm^2$ at 20 mV/s in $H_2SO_4$ [11]. Note that the use in [10] and [11] of an acidic aqueous electrolyte has the drawback of having a narrow potential range.

Besides these works, patent application CN 102354612 reports a different concept for which the nanotubes, vertically aligned with respect to the surface of the carbon fibre fabrics and obtained by direct growth by CVD, are electrochemically coated with nanoparticles of $MnO_2$, a pseudocapacitive material [12]. This material is composed of a conductive and porous lattice having a large specific surface area, an excellent mechanical strength and chemical stability, which makes it an ideal material for a high-performance supercapacitor electrode. However, this material has limited operating voltages and possible cyclings only in an aqueous or protonic medium.

Due to the growing interest of supercapacitors with porous carbonaceous material, the inventors set themselves the aim of proposing an electrode comprising such a material, that can be produced via a method that is easy to industrialise and having advantageous properties notably in terms of capacitance and in particular in terms of surface capacitance.

DESCRIPTION OF THE INVENTION

The present invention makes it possible to achieve the aim set by the inventors because, thanks to their work, they were able to demonstrate that it was possible to further enhance, from VACNT synthesis, the performances, particularly in terms of capacitance, of electrodes with a substrate made of porous carbonaceous material having VACNTs and an electrically conducting organic polymer matrix.

Indeed, through a wise choice of the operating conditions used for the VACNT synthesis based on the method described in [8], the inventors were able to obtain a porous carbonaceous material substrate which has VACNTs not only on the surface thereof but also in the body thereof. The operating conditions selected by the inventors namely the pressure at which the VACNT growth is carried out and the orientation of the injection of the precursors required for this growth made it possible to incorporate VACNTs on the surface of the porous carbonaceous material substrate and in the body of this material. The presence of these VACNTs in the body of the material generates a larger carbonaceous surface area available for the subsequent deposition of the ECP, increases the specific surface area and maintains, or even increases the electrical conductivity of the material, which gives rise to beneficial impacts on the performances of the electrode containing such a material.

Thus, the present invention relates to a method for providing a substrate made of a porous carbonaceous material with vertically aligned carbon nanotubes, said method having a first step of depositing a ceramic sublayer on said substrate followed by a second synthesis step, by catalytic chemical vapour deposition, of said vertically aligned carbon nanotubes on the substrate obtained following the first step, the carbon source required for the synthesis during this second step being injected in a substantially perpendicular direction to the plane of the substrate and at a pressure less than $8.10^4$ Pa (800 mbar).

"Substrate made of a porous carbonaceous material" means a substrate made of a material essentially consisting of a carbon skeleton and having pores. Advantageously, with a view to an application for preparing an electrode, this material is electrically conducting.

Typically, the substrate made of a porous carbonaceous material used within the scope of the present invention is in the form of carbon fibres or a carbon foam. In the case of carbon fibres, the latter are presented both in non-woven form of the bundle or unidirectional (UD) form type and in woven form thus forming a fabric (or a lap). In the case of carbon fibres or a carbon fibre fabric, the pores of the porous material correspond to the gaps present between the carbon fibres. A carbon foam has an open porosity, formed of interconnected cells, also known as porous cavities, the walls of which are made of a carbonaceous material.

The substrate used in the invention has a shape adapted to the subsequent use thereof and particularly to prepare an electrode. By way of illustrative examples, this substrate can have a planar shape or a ribbon shape. Typically, the substrate used in the invention has a thickness between 1 µm and 1 mm and particularly between 2 µm and 500 µm.

"Providing a substrate made of a porous carbonaceous material with vertically aligned carbon nanotubes" or "endowing a substrate made of a porous carbonaceous material with vertically aligned carbon nanotubes" means synthesising, on the surface and in the body of the substrate, carbon nanotubes. These nanotubes extend substantially perpendicularly to the surface of the substrate i.e. the axis of the carbon nanotubes is substantially perpendicular to the axis of the carbon fibres present on the surface and in the body of the substrate or the axis of the carbon nanotubes is substantially perpendicular to the surface of the cell walls on the surface and in the body of the carbon foam. These carbon nanotubes form sheets, the base of which corresponds either to carbon fibres, or to cell walls of a carbon foam.

The first and second steps of the method according to the invention are steps well-known to a person skilled in the art particularly described in international application WO 2009/103925 [8] and international application WO 2015/071408 [9]. These steps can be carried out in batches (so-called "batch-to-batch" technique)/continuously (so-called "rollto-roll" technique), they are therefore easy to industrialise. Note that, as explained above, the method according to the present invention differs from the methods of the prior art, on one hand, by the direction of injection of the precursors required for the growth of the carbon nanotubes and, on the other, by the pressure at which this growth is carried out.

Thus, the first step consists of forming, on the substrate made of a porous carbonaceous material, a ceramic sublayer. The term "ceramic" means both an oxide ceramic such as a silicon oxide ($SiO_x$ where $0<x\leq2$), aluminium oxide ($Al_2O_3$), zirconium oxide ($ZrO_2$) or titanium oxide ($TiO_2$) and a non-oxide ceramic such as silicon carbide (SiC), silicon carbonitride (SiCN), aluminium nitride (AlN), titanium nitride (TiN), silicon oxynitride (SiON) or silicon oxycarbonitride (SiOCN). Advantageously, the ceramic used in the method according to the invention is an oxide ceramic and particularly silicon oxide ($SiO_x$ where $0<x\leq2$). This first step is carried out by chemically decomposing, by pyrolysis, ceramic precursors of the organometallic precursor type such as alkoxysilanes like tetraethoxysilane (TEOS). Further precursors suitable for use are provided in [8]. The precursors, prior to the decomposition thereof, are dissolved or placed in suspension in an organic solvent liquid at ambient pressure and temperature such as, by way of illustrative and non-exhaustive examples, benzene, toluene, xylene, cyclohexane, hexane or heptane. Typically, this first step is performed at a temperature between 200° C. and 1100° C. and at a pressure between $1.10^3$ Pa (10 mbar) and $1.10^5$ Pa (1000 mbar). It was demonstrated that the thickness of the ceramic sublayer thus obtained has an effect on the subsequent VACNT growth. Thus, a person skilled in the art will be able, through a routine procedure, to define the most suitable thickness. This layer acts as a diffusion barrier layer between the substrate and the precursors required for VACNT growth.

Indeed, the synthesis during the second step is performed in the presence of precursors which are a catalytic source and a carbon source. The catalytic source can be pre-deposited on the substrate or, on the other hand, be co-injected with the carbon source. When the catalytic source is pre-deposited, this pre-deposition is carried out using a chemical or physical technique. By way of illustrative examples, this pre-deposition can be carried out (i) by immersing the substrate made of a porous carbonaceous material whereon the ceramic sublayer has been formed in a solution containing the catalytic source, (ii) by injecting the catalytic source under different conditions in terms of direction of injection and/or pressure from those defined by the injection of the carbon source in accordance with the method according to the invention, or (iii) by injecting the catalytic source under the same conditions in terms of direction of injection and pressure from those defined for the injection of the carbon source in accordance with the method according to the invention.

The catalytic source is particularly selected from transition metal metallocenes such as, for example, ferrocene, nickelocene, cobaltocene or any one of the mixtures thereof. The carbon source optionally containing further atoms such as nitrogen, which can be liquid, solid or gaseous is particularly selected from hydrocarbons, alcohols, carbon monoxide, carbon halides, toluene, cyclohexane, oils of plant origin, benzylamine, acetonitrile, ethylenediamine, dicyanopentane, ethylene, acetylene, xylene, methane and any one of the mixtures thereof. In the case of a solid carbonaceous source such as, for example, camphor, the latter must be subjected to a sublimation step during the synthesis. In a specific embodiment of this synthesis involving the co-injection of the catalytic source and the carbon source, ferrocene is conveyed into the reactor using a toluene solution placed in aerosol form.

Within the scope of the second step of the method according to the invention, this synthesis is advantageously carried out at a temperature between 500° C. and 1100° C. In certain implementations, this temperature is between 800° C. and 1000° C. In further implementations, it can be between 500° C. and 750° C.

First of all, the method according to the present invention is characterised by the direction of injection of the carbon source and optionally of the catalytic source (case of co-injection). Indeed, the source of carbon and optionally the catalytic source (case of co-injection) required for the synthesis during the second step is/are injected in a direction substantially perpendicular to the plane of the substrate. This configuration is defined, herein, by "vertical configuration" as opposed to "horizontal configuration" used in [8]. "Substantially perpendicular" means that the direction of injection and the substrate plane forms an angle between 60° and 120° and particularly of the order of 90° (i.e. 90°±20° or 90°±10°).

Furthermore, the injection of the carbon source and optionally of the catalytic source (case of co-injection) is typically carried out at a pressure less than $8.10^4$ Pa (800 mbar), notably between $10^3$ Pa (10 mbar) and $7.5.10^4$ Pa (750 mbar), in particular, between $10^4$ Pa (100 mbar) and $7.10^4$ Pa (700 mbar) and, more particularly, between $3.10^4$ Pa (300 mbar) and $6.10^4$ Pa (600 mbar).

Thus, the growth rate of the carbon nanotubes is relatively high, particularly between 1 $\mu m \cdot min^{-1}$ and 30 $\mu m \cdot min^{-1}$ according to the operating conditions (temperature and pressure) used. It is possible to control the length of the carbon nanotubes by varying the duration of carbon nanotube synthesis i.e. the duration of the second step of the method according to the invention.

The first step and the second step of the method according to the invention are carried out in a closed enclosure, resistant to a high temperature and to a reduced pressure.

In a first implementation of the method according to the invention, the first step and the second step of the method according to the invention are carried out in the same reaction chamber, the latter being present in the enclosure as defined above.

In a second implementation of the method according to the invention, the first step and the second step are carried out respectively in a first chamber or "pre-treatment chamber" and in a second chamber or "reaction chamber". These two separate chambers are present in the enclosure as defined above. Advantageously, the pressure at which the first step is carried out is identical to that used during the second step.

Advantageously, in this first and second implementations, the flux of ceramic precursors is injected in a direction substantially perpendicular to the plane of the substrate and/or the first step is carried out at the same pressure as that used during the second step i.e. a pressure less than $8.10^4$ Pa (800 mbar) and optionally at the same temperature as that used during the second step.

The present invention also relates to the substrate provided with vertically aligned carbon nanotubes obtained following the method according to the invention. These carbon nanotubes have a good anchoring and a good adherence to the substrate i.e. to the carbon fibres or to the carbon foam cell walls, which is favourable for a good transfer of electric charge and heat between the nanotubes and the carbon fibres or the carbon foam.

The latter is markedly distinguished from the material obtained following the method according to international application WO 2009/103925 [8]. Indeed, by injecting the precursors of the carbon nanotubes parallel with the surface of the substrate i.e. horizontal configuration, carbon nanotubes grow primarily on the fibres on the surface of the substrate but short and non-aligned nanotubes can also grow on some of the carbon figures in a sub-surface zone, the volume of which represents not more than 10% of the total volume of the substrate. On the contrary, within the scope of the present invention and as illustrated in FIG. 2C hereinafter, the carbon nanotubes are present in a sub-surface zone, the volume whereof represents more than 20%, notably more than 40%, in particular more than 60% and, more particularly, more than 80% of the total volume of the substrate made of a carbonaceous material.

Advantageously, for the substrate obtained following the method according to the invention, the density of the vertically aligned carbon nanotubes can be variable. The density of the carbon nanotubes on the surface of the substrate is advantageously between $10^6$ and $10^{13}$ nanotubes·cm$^{-2}$ of substrate. It is thus possible to have a material having dense sheets of vertically aligned carbon nanotubes, with of the order of $10^8$ to $10^{12}$ nanotubes·cm$^{-2}$ and particularly of the order of $10^{10}$ to $10^{12}$ nanotubes·cm$^{-2}$. Moreover, the substrate also has vertically aligned carbon nanotubes in the body thereof.

For the substrate obtained following the method according to the invention, the carbon nanotubes have advantageously a mean length greater than 10 µm. In certain embodiments, this mean length can be greater than 20 µm, notably greater than 30 µm, in particular greater than 50 µm and, more particularly, greater than 100 µm. The highest value cited is advantageously obtained for vertically aligned carbon nanotubes present on the surface of the substrate, the length of the vertically aligned carbon nanotubes present in the body of the substrate being less for precursor diffusion and availability problems. Furthermore, some of the vertically aligned carbon nanotubes present on the surface of the substrate made of porous carbonaceous material can have a length of the order of 150 µm (150 µm±30 µm).

The properties of the substrate provided with vertically aligned carbon nanotubes obtained following the method according to the invention make it a good candidate for preparing an electrode but also as a catalyst substrate. The present invention therefore relates to the use of this substrate as a catalyst substrate. This use finds applications particularly for a subsequent synthesis of carbon nanotubes or silica nanotubes or for producing hydrogen, the supported catalysts potentially being, in this case, based on molybdenum, nickel, cobalt, iron or molecular complexes such as cobalt diimine-dioxime derivatives.

The substrate according to the present invention is particularly useful for preparing an electrode. Thus, the present invention also relates to a method for preparing an electrode comprising a substrate made of a porous carbonaceous material, vertically aligned carbon nanotubes and an electrically conducting polymer matrix, said method comprising the following successive steps:

a) providing a substrate made of a porous carbonaceous material with vertically aligned carbon nanotube sheets according to the method described above;

b) electrochemically depositing said polymer matrix on said carbon nanotubes using an electrolytic solution comprising at least one precursor monomer of said matrix.

Following the synthesis of the vertically aligned carbon nanotubes i.e. following step (a) and prior to step (b), the vertically aligned carbon nanotubes can be subjected to an oxidising treatment (or pre-treatment) i.e. intended to oxidise the surface of the nanotubes used and/or prepare the surface for future oxidation by radical formation. An oxidation modifies the surface of the nanotubes particularly by binding and/or introducing, on the ends or defects of the nanotubes, oxygen-rich groups such as carboxylic (—COOH i.e. —C(=O)OH), hydroxyl (—OH), alkoxyl (—OX where X represents an alkyl group, an acyl group or an aroyl group), carbonyl (—C(=O)—), percarbonic (—C(=O)—O—OH) and sometimes amide (—CONH) type groups.

Such an oxidising treatment rests on two major types of surface modifications based on:

physical treatments such as a plasma treatment notably of oxygen, a UV treatment, an X or γ ray treatment, an electron or heavy ion irradiation treatment or chemical treatments such as a treatment with alcoholic potash, a treatment with a strong acid (HCl, $H_2SO_4$, $HNO_3$, $HClO_4$), a treatment with soda, a treatment with a strong oxidant ($KMnO_4$, $K_2Cr_2O_7$, $KClO_3$ or $CrO_3$ in hydrochloric acid, sulphuric acid or nitric acid), a treatment with ozone and a heat treatment in an oxygenated atmosphere ($O_2$, $H_2O$, etc.).

Such nanotubes, once this oxidising treatment has been implemented, can be presented in the form of surface-modified nanotubes such as, for example, negatively charged nanotubes.

Step (b) of the method according to the present invention consists of electrochemically applying on the carbon nanotube sheets synthesised during step (a) on the surface and in the body of the substrate made of a porous carbonaceous material, an electrically conducting polymer matrix.

"Electrically conducting polymer matrix" means, within the scope of the present invention, a structure presented in the form of a porous or non-porous film, on the surface of the carbon nanotubes used in the method according to the invention and essentially consisting of one (or more) electrically conducting (co)polymer(s). In the sheet of carbon nanotubes as obtained following step (a) of the method, the matrix is associated with the carbon nanotubes by being deposited along the entire length of the VACNTs, i.e. on and at the lateral surface of the carbon nanotubes, capable of advantageously forming a cladding around the nanotubes, as well as in the space between the nanotubes. Advantageously, the thickness of this cladding is homogeneous for a carbon nanotube and, more advantageously, it is homogeneous for all of the carbon nanotubes on the surface and in the body of the substrate made of a porous carbonaceous material.

"Electrically conducting (co)polymer" means, within the scope of the present invention, a (co)polymer wherein the main polymer chain and optionally the side chains have at least one double bond or at least one aromatic ring. Typically, an electrically conducting (co)polymer is obtained by polymerising one (or more) polymer(s) carrying a double bond and/or an aromatic ring and optionally a heteroatom such as an oxygen atom, a nitrogen atom, a sulphur atom or a fluorine atom.

The polymer matrix used within the scope of the present invention advantageously consists of one (or more) (co)polymers selected from polyfluorenes, polypyrenes, polyazulenes, polynaphthalenes, polypyrroles, polycarbazoles, polyindoles, polyazepines, polyanilines, polythiophenes, phenylene polysulphide or ABA type polymers composed of an aromatic unit B such as benzene, thiophene, pyrrole, carbazole, fluorene, optionally functionalised by conjugated alkyl, alkoxy, oligoether, thioether, or alkene or alkyne chains and of electropolymerisable units A of the thiophene, alkylthiophene, 3,4-alkylenedioxythiophene type and derivatives thereof or pyrrole, alkylpyrrole, N-alkylpyrrole, 3,4-alkylenedioxypyrrole and derivatives thereof.

Advantageously, the polymer matrix used within the scope of the present invention consists of one (or more) (co)polymer(s) selected from polypyrroles, polycarbazoles, polyanilines and polythiophenes.

A person skilled in the art knows various precursor monomers usable for obtaining by polymerisation, the polymers listed above.

By way of examples, polypyrroles can be obtained by polymerising one (or more) monomer(s) selected from pyrrole and pyrrole derivatives. A pyrrole derivative is advantageously a pyrrole substituted by at least one substituent selected from a linear, branched or cyclic, C1 to 10, and notably C1 to C5 (hetero)alkyl, optionally substituted; a halogen atom; an —OH group; a —COOH group; a C2 to C20 and notably C2 to C10 alkoxyalkyl, optionally substituted; an alkoxyl polyether; an alkylene polyether; a C3 to C20 and particularly C4 to C16 (hetero)aryl, optionally substituted or a C3 to C20 and notably C4 to C16 (hetero) aralkyl, optionally substituted. Such a pyrrole derivative is notably an alkylpyrrole, an N-alkylpyrrole or a 3,4-alkylenedioxypyrrole. A pyrrole derivative can also be a pyrrole substituted by at least two substituents forming a C1 to C10 and notably C1 to C5 bridging group optionally comprising a heteroatom. By way of examples of pyrrole derivatives suitable for use, mention can be made of 3-methyl pyrrole, 3-ethyl pyrrole, 3-butyl pyrrole, 3-bromo pyrrole, 3-methoxy pyrrole, 3,4-dichloro pyrrole and 3,4-dipropoxy pyrrole.

"Optionally substituted" means within the scope of the present invention a group which can be substituted by —OH, —COOH, a halogen atom or a C1 to C4 alkyl.

By way of examples, polycarbazoles can be obtained by polymerising one (or more) monomer(s) selected from carbazole and carbazole derivatives. A carbazole derivative is advantageously a carbazole substituted by at least one substituent selected from a linear, branched or cyclic, C1 to 10 and notably C1 to C5 (hetero)alkyl, optionally substituted; a halogen atom; an —OH group; a —COOH group; a C2 to C20 and notably C2 to C10 alkoxyalkyl, optionally substituted; an alkoxyl polyether; an alkylene polyether; a C3 to C20 and notably C4 to C16 (hetero)aryl, optionally substituted or a C3 to C20 and notably C4 to C16 (hetero) aralkyl, optionally substituted. A carbazole derivative can also be a carbazole substituted by at least two substituents forming a C1 to C10 and notably C1 to C5 bridging group optionally comprising a heteroatom.

By way of examples, polyanilines can be obtained by polymerising one (or more) monomer(s) selected from aniline and aniline derivatives. An aniline derivative is advantageously an aniline substituted by at least one substituent selected from a linear, branched or cyclic, C1 to 10 and notably C1 to C5 (hetero)alkyl, optionally substituted; a halogen atom; an —OH group; a —COOH group; a C2 to C20 and notably C2 to C10 alkoxyalkyl, optionally substituted; an alkoxyl polyether; an alkylene polyether; a C3 to C20 and particularly C4 to C16 (hetero)aryl, optionally substituted or a C3 to C20 and notably C4 to C16 (hetero) aralkyl, optionally substituted. An aniline derivative can also be an aniline substituted by at least two substituents forming a C1 to C10 and notably C1 to C5 bridging group optionally comprising a heteroatom.

By way of examples, polythiophenes can be obtained by polymerising one (or more) monomer(s) selected from thiophene and thiophene derivatives. A thiophene derivative is advantageously a thiophene substituted by at least one substituent selected from a linear, branched or cyclic, C1 to 10 and notably C1 to C5, (hetero)alkyl, optionally substituted; a halogen atom; an —OH group; a —COOH group; a C2 to C20 and notably C2 to C10 alkoxyalkyl, optionally substituted; an alkoxyl polyether; an alkylene polyether; a C3 to C20 and notably C4 to C16 (hetero)aryl, optionally substituted or a C3 to C20 and notably C4 to C16 (hetero) aralkyl, optionally substituted. Of the thiophenes substituted by at least one C3 to C20 (hetero)aryl, mention can be made of thiophenes substituted by at least one perfluorinated C3 to C20 aryl. A thiophene derivative can also be a thiophene substituted by at least two substituents forming a C1 to C10 and notably C1 to C5 bridging group optionally comprising a heteroatom. By way of examples of thiophene derivatives suitable for use, mention can be made of 3-thiophene acetic acid, 3,4-ethylenedioxythiophene, 3-methylthiophene (3MT), 3,4-dimethylthiophene, 3-ethylthiophene, 3-butylthiophene, 3-bromothiophene, 3-methoxythiophene, 3,4-dimethoxythiophene, 3,4-dichlorothiophene, 3,4-dipropoxythiophene and 3-perfluorophenylthiophene.

Advantageously, step (b) of the method according to the invention comprises the following substeps:

$b_1$) contacting the substrate made of porous carbonaceous material having vertically aligned carbon nanotubes with an electrolytic solution containing the precursor monomer(s) of said conducting polymer matrix;

$b_2$) polarising said carbon nanotubes whereby said conducting polymer matrix is electrochemically deposited on said carbon nanotubes.

The electrolytic solution used in the method according to the invention comprises a monomer or several different monomers, precursor(s) of the electrically conducting polymer matrix in a solvent. The latter can be a protic solvent, an aprotic solvent, an ionic liquid or one of the mixtures thereof.

The term "mixture" means a mixture of at least two different protic solvents, a mixture of at least two different aprotic solvents, a mixture of at least two different ionic liquids, a mixture of at least one protic solvent and at least one aprotic solvent, a mixture of at least one protic solvent and at least one ionic liquid or even a mixture of at least one aprotic solvent and at least one ionic liquid.

"Protic solvent" means, within the scope of the present invention, a solvent which includes at least one hydrogen atom capable of being released in proton form and advantageously selected from the group consisting of acidified or basic, water, deionised water, distilled water; acetic acid, hydroxylated solvent such as methanol and ethanol, low-molecular-weight liquid glycols such as ethyleneglycol, and mixtures thereof.

"Aprotic solvent" means, within the scope of the present invention, a solvent which is not capable of releasing a proton or of accepting one under non-extreme conditions and advantageously selected from halogenated alkanes such as dichloromethane; dimethylformamide (DMF); ketones such as acetone or 2-butanone; acetonitrile; propylene carbonate, gamma-butyrolactone (GBL), tetrahydrofuran (THF); N-methylpyrrolidone (NMP); dimethylsulfoxide (DMSO) and mixtures thereof.

When the solvent used is a protic solvent, an aprotic solvent or one of the mixtures thereof, the electrolytic solution suitable for use within the scope of the present invention comprises, in addition to this solvent, an electrolyte in the form of a salt dissolved in the solvent. The anion of this salt can be selected from inorganic anions such as Br$^-$, Cl$^-$, HCO$_3^-$, H$_2$PO$_4^-$, Cr$_2$O$_4^{3-}$, BF$_4^-$ or PF$_6^-$; organic anions; polymeric anions and biological anions. The cation of this salt is a metallic cation such as Li$^+$, Na$^+$, Mg$^{2+}$, Cu$^{2+}$, Zn$^{2+}$ and Al$^{3+}$.

Further examples of solvents and electrolytes suitable for use within the scope of the present invention are given in paragraphs [0040] to [0048] of patent application US 2003/077515 [13].

Within the scope of the present invention, an "ionic liquid" is an organic salt in a liquid state at a temperature less than 100° C. and particularly in a liquid state at ambient temperature (i.e. 22° C.±5° C.).

Of these ionic liquids, mention can be made of ionic liquids having at least one protic or aprotic cation, substituted or unsubstituted, selected from the family of pyridinium, pyridazinium, pyrimidinium, pyrazinium, imidazolium, pyrazolium, thiazolium, oxazolium, triazolium, ammonium, pyrrolidinium, pyrrolinium, pyrrolium, piperidinium and at least anion, optionally organic, substituted or unsubstituted, selected from F$^-$; Cl$^-$, Br$^-$; I$^-$; NO$_3^-$; N(CN)$_2^-$; BF$_4^-$; ClO$_4^-$; PF$_6^-$; RSO$_4^-$; RSO$_3^-$; RCOO$^-$ where R is an alkyl or phenyl group; (CF$_3$)$_2$PF$_4^-$; (CF$_3$)$_3$PF$_3^-$; (CF$_3$)$_4$PF$_3^-$; (CF$_3$)$_5$PF$^-$; (CF$_3$)$_6$P$^-$; (CF$_2$SO$_3^-$)$_2$; (CF$_2$CF$_2$SO$_3^-$)$_2$; (CF$_3$SO$_2$)$_2$N$^-$; CF$_3$CF$_2$(CF$_3$)$_2$CO$^-$; (CF$_3$SO$_2$)$_2$CH$^-$; (SF$_5$)$_3$C$^-$; (CF$_3$SO$_2$)$_3$C$^-$; [O(CF$_3$)$_2$C$_2$(CF$_3$)$_2$ O]$_2$PO$^-$; CF$_3$(CF$_2$)$_7$SO$_3^-$; CNSe$^-$; CNS$^-$; bis(oxalato)borate and an anion derived from imidazole.

Further examples of cations suitable for use for the ionic liquid used in the present invention are described in international application WO 2012/004317 [14] (page 24, lines 1 to 22). Similarly, further ionic liquids suitable for use within the scope of the present invention are described in international application WO 2008/016990 [15] (page 18, lines 5 to 23).

Advantageously, the ionic liquid used within the scope of the present invention is selected from the group consisting of a dialkylpyrrolidinium bis(trifluoromethylsulfonyl)imide ([DAPyr][TFSI]), a dialkylpyrrolidinium bis(fluoromethylsulfonyl)imide ([DAPyr][FSI]), a dialkylpyrrolidinium tetrafluoroborate ([DAPyr][BF4]), a dialkylpyrrolidinium hexafluorophosphate ([DAPyr][PF6]), a dialkylpyrrolidinium selenocyanate ([DAPyr][SeCN]), a dialkylpyrrolidinium thiocyanate ([DAPyr][SCN]), a dialkylpyrrolidinium bromide ([DAPyr][Br]), 1-ethyl-3-methylimidazolium bis(trifluoromethylsulfonyl)imide ([EMI][TFSI]), 1-ethyl-3-methylimidazolium bis(fluoromethylsulfonyl)imide ([EMI][FSI]), 1-ethyl-3-methylimidazolium tetrafluoroborate ([EMI][BF4]), 1-ethyl-3-methylimidazolium hexafluorophosphate ([EMI][PF6]), 1-ethyl-3-methylimidazolium selenocyanate ([EMI][SeCN]), 1-ethyl-3-methylimidazolium thiocyanate ([EMI][SCN]), 1-butyl-3-methylimidazolium bis(trifluoromethylsulfonyl)imide ([BMI][TFSI]), 1-butyl-3-methylimidazolium tetrafluoroborate ([BMI][BF4]), 1-butyl-3-methylimidazolium hexafluorophosphate ([BMI][PF6]), 1-methyl-3-n-hexylimidazolium iodide ([MHIm][I]) and butyltrimethylammonium bis(trifluoromethylsulfonyl)imide ([BtMA][TFSI]).

In a specific embodiment, the solvent of the electrolytic solution used in the method according to the invention is a mixture of at least one ionic liquid as defined above and at least one protic solvent as defined above.

In a further specific embodiment, the solvent of the electrolytic solution used in the method according to the invention is a mixture of at least one ionic liquid as defined above and at least one aprotic solvent as defined above. In particular, in this embodiment, the aprotic solvent is acetonitrile, the ionic liquid optionally being any one of the ionic liquids envisaged above.

The proportions of ionic liquid and of protic or aprotic solvent in the electrolytic solution used in the present invention vary according to the viscosity of the ionic liquid so as to retain a low overall viscosity in this solution ensuring satisfactory diffusion of the species within the liquid medium filling the inter-tube spaces. These proportions can be from 15 to 85% by volume for the protic or aprotic solvent and the remainder to 100% for the ionic liquid. Thus, the mixture can include between 60 and 85% by volume of protic or aprotic solvent and between 15 and 40% by volume of ionic liquid and particularly about 75% (i.e. 75%±5%) by volume of protic or aprotic solvent and about 25% (i.e. 25%±5%) by volume of ionic liquid. A particular example of such a mixture is a mixture having about 75% by volume of acetonitrile and about 25% of [EMI][TFSI] or [EMI][BF4]. Alternatively, the mixture can include between 40 and 60% by volume of protic or aprotic solvent and between 40 and 60% by volume of ionic liquid and particularly about 50% (i.e. 50%±5%) by volume of protic or aprotic solvent and about 50% (i.e. 50%±5%) by volume of ionic liquid. A particular example of such a mixture is a mixture having about 50% by volume of acetonitrile and about 50% of [EMI][TFSI] or [EMI][BF4].

The precursor monomer(s) of the conducting polymer matrix is(are) present in the electrolytic solution in a maximum quantity determined with respect to the solubility thereof in the solvent used. Typically, the precursor monomer(s) of the conducting polymer matrix is(are) present in a quantity between 2% and 20% by volume with respect to the total volume of said electrolytic solution.

Furthermore, the electrolytic solution must have a viscosity adapted to enable a penetration between the carbon nanotubes (inter-tube spacing between a few nm and around one hundred nm) in a homogeneous manner and, ideally, over the entire thickness of the sheets present on the surface and in the body of the substrate made of a porous carbonaceous material. In the case of an electrolytic solution wherein the solvent comprises at least one ionic liquid, the viscosity thereof is closely dependent on the nature and the proportion of ionic liquid contained therein. Typically, this viscosity is between 0.37 mPa·s and 200 mPa·s and advantageously between 1.0 mPa·s and 36 mPa·s under standard temperature and pressure conditions.

The electrochemical deposition of the electrically conducting polymer matrix on the carbon nanotubes during step (b) or during substep (b$_2$) of the method according to the invention can involve either a cyclic method, or a static, pulsed or not, method with either the voltage, or the current which is imposed thereon. In a specific embodiment, it is possible to carry out this electrochemical deposition by combining these different methods. In other words, the electrochemical deposition method can be carried out using a pulsed or continuous galvanostatic method and/or a pulsed or continuous potentiostatic method. The deposition method consists of oxidising a precursor present in the electrolyte to polymerise it and deposit it in the form of an electroconductive polymer around and on the carbon nanotubes.

The electrochemical deposition during step (b) or during substep (b$_2$) of the method according to the invention is typically carried out in an electrochemical cell equipped with two electrodes (working electrode and counter electrode) or three electrodes (working electrode, counter electrode and reference electrode). The working electrode (or anode) corresponds to the porous carbon substrate provided with the carbon nanotubes, whereas the counter electrode (or cathode) is, for example, a platinum grid or a platinum-plated titanium plate or a carbon black and activated carbon paste encapsulated in a stainless steel grid or a carbon black, activated carbon or Teflon paste encapsulated in a stainless steel grid for the electrical contact. The counter electrode has a surface area and a capacitance adapted to the surface area and to the capacitance of the working electrode. When it is present, the reference electrode which makes it possible to ascertain, at any time, the value of the potential of the working electrode, is typically a pseudo-reference type electrode made of metal such as, for example, a silver wire or a platinum wire.

The electrochemical device used in the invention comprises an electrochemical cell as defined above associated with a current or voltage generator.

The cyclic electrochemical deposition or cyclic voltammetry method consists of varying the potential of the working electrode at a given scanning speed. The voltage range applied is selected according to the desired potential range for the working electrode. Advantageously, during step (b) or during substep ($b_2$) of the method according to the invention, the voltage can vary from −3 to +3 V and, in particular, from −2 to +2 V according to the monomer and the electrolyte selected. The current varies according to the size of the sample and according to the scanning speed such that the current density is of the order of 10 mA·cm$^{-2}$. The scanning speed is particularly between 2 and 500 mV/s, in particular, between 3 and 100 mV/s and, more particularly, between 5 and 30 mV/s. The number of cycles is particularly between 15 and 200 and, in particular, between 20 and 150. By way of illustrative example of conditions used during the cyclic voltammetry for the monomer 3-methylthiophene (3MT) at a concentration of 0.4 M in an equal volume of acetonitrile and [EMI][TFSI], mention can be made of:

an imposed voltage between −0.5 and 1.6 V at a scanning speed of 20 mV/s for 24 cycles;

an imposed voltage between −0.5 and 1.35 V at a scanning speed of 20 mV/s for 10 cycles then an imposed voltage between −0.5 and 1.25 V at a scanning speed of 20 mV/s for 26 cycles.

The pulsed potentiostatic or pulsed galvanostatic method consists of successively carrying out electroconductive polymer deposition times ($t_{ON}$) and rest times ($t_{OFF}$) by applying, between the cathode and the anode, a voltage or respectively a current. Within the scope of the method according to the invention, the deposition time corresponds to the oxidation of the precursor monomer. This oxidation is performed by applying either a current for a given time ($t_{ON}$) (chronopotentiometry), or a voltage for a given time ($t_{ON}$) (chronoamperometry). During $t_{OFF}$, the monomer is not oxidised, which leaves it the time to diffuse within the carbon nanotube sheet. This rest time $t_{OFF}$ can be obtained by opening the electric circuit or by applying a lower current or voltage than that imposed during the deposition time $t_{ON}$ and not allowing the monomer to oxidise. During this rest time $t_{OFF}$, stirring of the electrolytic solution can be implemented to facilitate the diffusion of the monomer within the sheet of vertically aligned carbon nanotubes.

Determining the most suitable times $t_{ON}$ and $t_{OFF}$ according to the electroconductive polymer to be deposited is a routine task for a person skilled in the art.

In the case of pulsed or non-pulsed chronopotentiometry, the imposed current during the deposition time $t_{ON}$ corresponds to a determined value which is adapted in order to obtain a sufficient voltage to oxidise the precursor monomer. The determined value is dependent on the type of precursor monomer(s) used and the viscosity of the electrolytic solution. For example, in the case of the monomer 3MT, for a surface area of substrate made of porous carbonaceous material provided with carbon nanotubes of the order of 1 cm$^2$, and for an electrolytic solution in which the solvent is composed of acetonitrile (75% or 50% by volume) and EMITFSI (25% or 50% by volume), the determined value of the current is about 4 mA.

In the case of pulsed or non-pulsed chronoamperometry, the imposed voltage during the deposition time $t_{ON}$ corresponds to a determined value which is adapted in order to obtain a sufficient current to oxidise the precursor monomer. The determined value is dependent on the type of precursor monomer(s) used and the viscosity of the electrolytic solution. For example, in the case of the monomer 3MT, for a surface area of substrate made of porous carbonaceous material provided with carbon nanotubes of the order of 1 cm$^2$, and for an electrolytic solution in which the solvent is composed of acetonitrile (75% or 50% by volume) and EMITFSI (25% or 50% by volume), the determined value of the voltage is about 1.5 V (i.e. 1.5 V±0.2 V).

When the technique used during step (b) or substep ($b_2$) of the method according to the invention is a pulsed technique, the number of pulses is defined by the mass quantity of polymer that it is sought to deposit. Typically, the number of pulses varies from 5 to 1000.

The duration of step (b) or substep ($b_2$) of the method according to the invention using either a cyclic voltammetry method, or a pulsed or non-pulsed, potentiostatic or galvanostatic method is variable from a few minutes to several hours. Typically, this duration between 5 min and 8 h, advantageously between 10 min and 4 h and, in particular, between 15 min and 2 h. It is dependent on the quantity of polymer to be deposited to obtain a homogeneous deposition around the vertically aligned carbon nanotubes. A person skilled in the art will know how to adapt, without exercising inventive skill, this duration according to the density and the length of the vertically aligned carbon nanotubes and the quantity of polymer matrix to be deposited.

Finally, it is possible to combine pulsed potentiostatic or pulsed galvanostatic methods. It is for example possible to firstly set the voltage (chronoamperometry) in order to oxidise the electroconductive polymer already deposited during previous cycles then set the current (chronopotentiometry) in order to oxidise the monomer, then leave the electric circuit open to allow the monomer to diffuse within the vertically aligned carbon nanotubes.

Step (b) and notably substep ($b_2$) of the method according to the invention are carried out at a temperature between 15° C. and 100° C. and advantageously at ambient temperature (i.e. 22° C.±5° C.). The temperature may be adapted according to the desired viscosity for the electrolytic solution.

Moreover, step (b) and notably substep ($b_2$) of the method according to the invention can be carried out in a non-controlled atmosphere i.e. in ambient air. Alternatively, they can be carried out in an atmosphere having the least oxygen and water possible. To this end, carrying out this step and this substep in an inert atmosphere can be envisaged. For this, an inert gas such as argon or nitrogen can be used to generate this inert atmosphere. The use of an inert atmosphere associated with bubbling an inert gas in the electrolytic solution makes it possible to remove any oxygen present therein.

It should be noted that the electrochemical deposition during step (b) and notably substep ($b_2$) of the method according to the invention can be industrialised, for example by means of a batch-to-batch technique or continuously (so-called "roll-to-roll" technique) with the substrate made of porous carbonaceous material immersed in an electrolytic solution as defined above.

The duration of step (b) and notably of substep ($b_2$) of the method according to the invention, makes it possible to adjust the mass percentage of the electrically conducting polymer matrix with respect to the total mass of the composite corresponding to the vertically aligned carbon nanotubes coated with this electrically conducting polymer matrix to maximise the capacitance of the composite once manufactured, in order to provide a supercapacitor using such a composite as an electrode, which has the highest possible capacitance. The electrically conducting polymer matrix represents a mass percentage with respect to the total mass of said composite of up to 99%, notably between 5 and 95% and, in particular, between 10 and 80%. The mass of the electrically conducting polymer matrix and that of the composite can be obtained by TGA, standing for "Thermogravimetric analysis" and/or by weighing and/or by integrating the current having passed through the electric circuit during the polymerisation step.

Following step (b) and notably following substep ($b_2$), the method according to the invention can have a rinsing step and optionally a drying step.

The main aim of the rinsing step is that of cleaning, removing monomer or oligomer type residues/impurities which would remain on parts of the substrate, carbon nanotubes or the polymer matrix and which would not have been deposited. Such residues/impurities could give rise to problems during the encapsulation step and supercapacitor malfunctions. Advantageously, the rinsing step is carried out by soaking the substrate made of a porous carbonaceous material provided with carbon nanotubes and the electrically conducting polymer matrix in an organic solvent such as acetonitrile, acetone, ethanol or isopropanol. A person skilled in the art would be able to determine the most suitable organic solvent for the rinsing step, the latter having to prevent any detachment of the polymer matrix. The rinsing consists of soaking the substrate made of a porous carbonaceous material provided with carbon nanotubes and the electrically conducting polymer matrix in the solvent for a variable time from 2 to 30 min and repeating the operation if required up to five times for example.

Furthermore, the optional step of drying the substrate made of a porous carbonaceous material, provided with carbon nanotubes and the electrically conducting polymer matrix can be carried out by leaving the latter, once rinsed, in the open air so that the solvent used for rinsing evaporates. Alternatively, this drying can be performed in an inert gas sweep or by heating the substrate made of a porous carbonaceous material, provided with carbon nanotubes and the electrically conducting polymer matrix, in a vacuum, or in inert gas or by means of an infrared lamp. This alternative embodiment can be implemented in the case of a continuous method.

The present invention also relates to an electrode capable of being prepared using the method according to the invention as defined above. This electrode has a substrate made of a porous carbonaceous material, provided with vertically aligned carbon nanotubes on the surface thereof and in the body thereof and an electrically conducting polymer matrix. Therefore, it consists of a monolayer electrode.

Everything previously stated about the substrate made of a porous carbonaceous material and about the vertically aligned carbon nanotubes also applies to the electrode according to the present invention i.e. comprising this substrate and these carbon nanotubes.

The mass percentage of the electrically conducting polymer material expressed with respect to the total mass of the composite comprising the carbon nanotubes and this matrix is between 10% and 90%, particularly between 10% and 80%, in particular, between 40% and 70%.

Finally, the electrode according to the invention has advantageously a capacitance of at least 200 $mF/cm^2$ and notably of at least 230 $mF/cm^2$.

The present invention also relates to the use of such an electrode or capable of being prepared by the method according to the invention as a positive/negative electrode of a device for storing and restoring electricity such as a supercapacitor or a battery, as an electrode for a photovoltaic device, in materials for storing $CO_2$ or as an electrode for electrochemical sensors. Thus, the present invention relates to a device comprising an electrode according to the present invention or capable of being prepared using the method according to the invention, said device being selected from the group consisting of a device for storing and restoring electricity such as a supercapacitor or a battery; a photovoltaic device; a material for storing $CO_2$ and an electrochemical sensor.

In a specific embodiment, a device for storing and restoring electricity according to the invention comprises at least two monolayer electrodes (positive and negative) or at least three electrodes including two monolayer electrodes (positive) and one double-layer electrode (negative). By way of reminder, a monolayer electrode only includes a single active surface, whereas a double-layer electrode includes two active surfaces respectively on the two opposite faces thereof.

Further features and advantages of the present invention will be apparent to a person skilled in the art on reading the examples hereinafter given by way of illustration and not limitation, with reference to the appended figures.

BRIEF DESCRIPTION OF THE DRAWINGS

FIG. 2 presents SEM micrographs showing: the VACNT growth preferentially on the fibres on the surface of the fabric (FIGS. 2A and 2B) and the VACNT growth on the surface fibres but also on those located in the thickness of the fabric (FIG. 2C).

DETAILED DESCRIPTION OF SPECIFIC EMBODIMENTS

I. VACNT Synthesis.

I.1. On the Surface of a Carbon Fibre Fabric (Comparative Example).

Preliminary Remark

In order to synthesise VACNTs only on the surface of a carbon fibre fabric, the technique used is the so-called "horizontal configuration" technique described in international application WO 2009/050247 [8] and using the device represented schematically in FIG. 15 of the same application.

Protocol

Both in the horizontal configuration and in the vertical configuration (see part 1.2 hereinafter), the synthesis of VACNTs on a carbon fibre fabric includes 2 steps taking place in the same reactor:

depositing a sublayer of SiOx acting as a diffusion barrier of the metallic catalyst required for VACNT growth. The Si-based organometallic precursor used is tetraethyl orthosilicate (TEOS). This deposition takes place at relatively low pressure and at a moderate temperature;

growing the VACNTs using a mixture of precursors comprising a catalytic source and a carbonaceous source which are, in this example, an organometallic precursor which is ferrocene and a liquid hydrocarbon which is toluene. This growth is performed at atmospheric pressure.

The synthesis conditions are summarised in Table 1 hereinafter.

TABLE 1

VACNT synthesis parameters on carbon fibre fabrics (injection in horizontal configuration)

| | Injection of Anhydrous toluene/TEOS | Injection of Toluene/ Ferrocene |
| --- | --- | --- |
| Synthesis temperature (° C.) | 500 | 850 |
| Argon flow rate (L/min) | 5 | 3 |
| Pressure (mbar) | 100 | 1000 |
| Mean mass of liquid injected (g/min) | 0.1 | 1.06 |
| Concentration in precursor mixture | 1 mol/L of TEOS | 2.5 wt % of Ferrocene |
| Injection time (s) | 360 | 450 |

Result

Figure 1A:
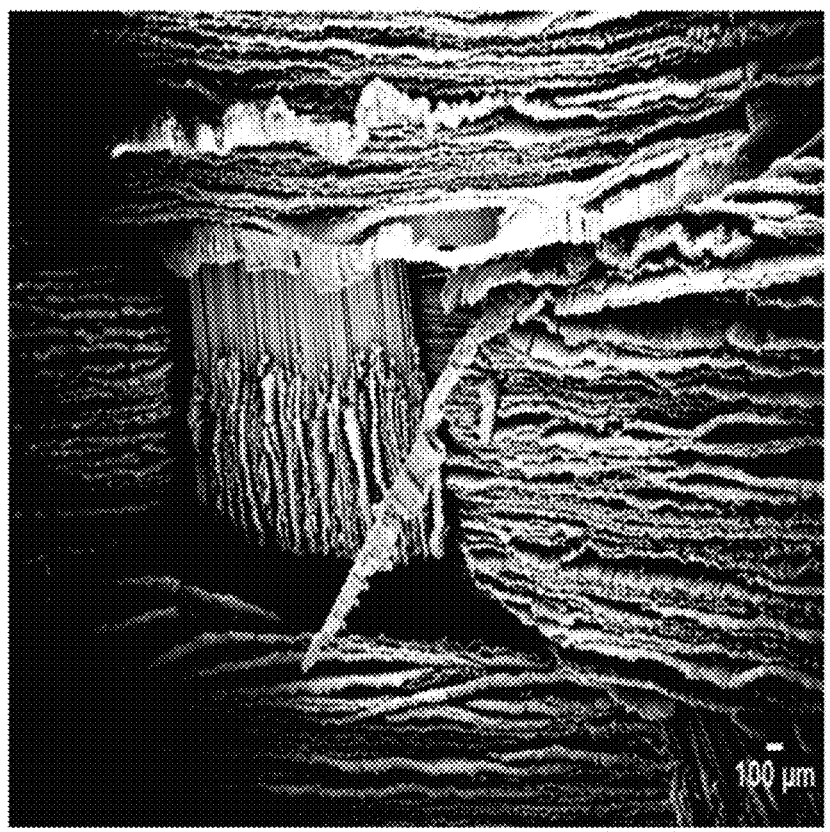
FIGS. 1A and 1B show scanning electron microscopy (SEM) images taken at different magnifications of a VACNT growth on carbon fibre fabric obtained according to the CVD synthesis method in a horizontal configuration (comparative example).
Figure 1B:
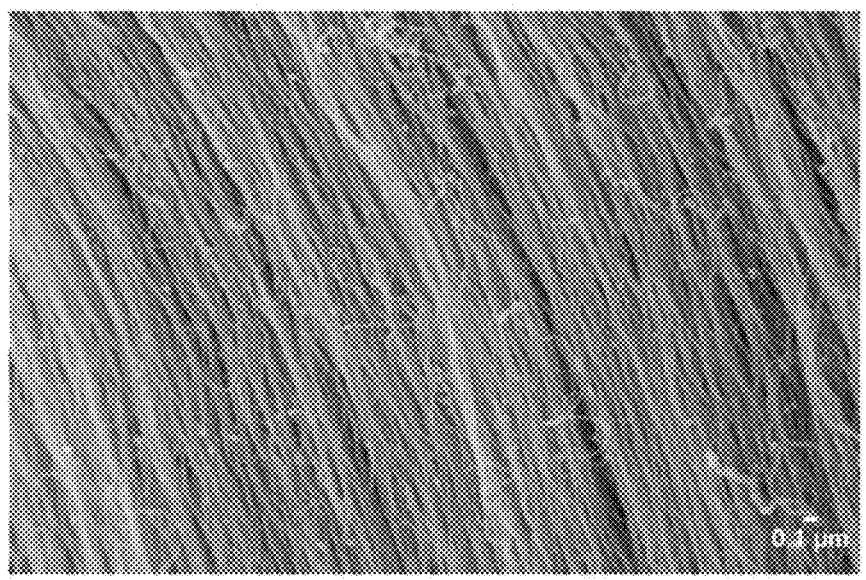

FIG. 1A shows an image of the carbon fibre fabric obtained following the synthesis method described above and shows sheets of carbon nanotubes (CNTs) aligned over the entire fabric surface. FIG. 1B provides an image with a greater magnification of the edge of a CNT sheet deposited on fibre showing the presence of aligned CNTs.

I.2. On the Surface and in the Body of a Carbon Fibre Fabric.

Device Used

In order to synthesise VACNTs on the surface and in the body of a carbon fibre fabric, the technique used in the so-called "vertical configuration" technique.

Figure 3:
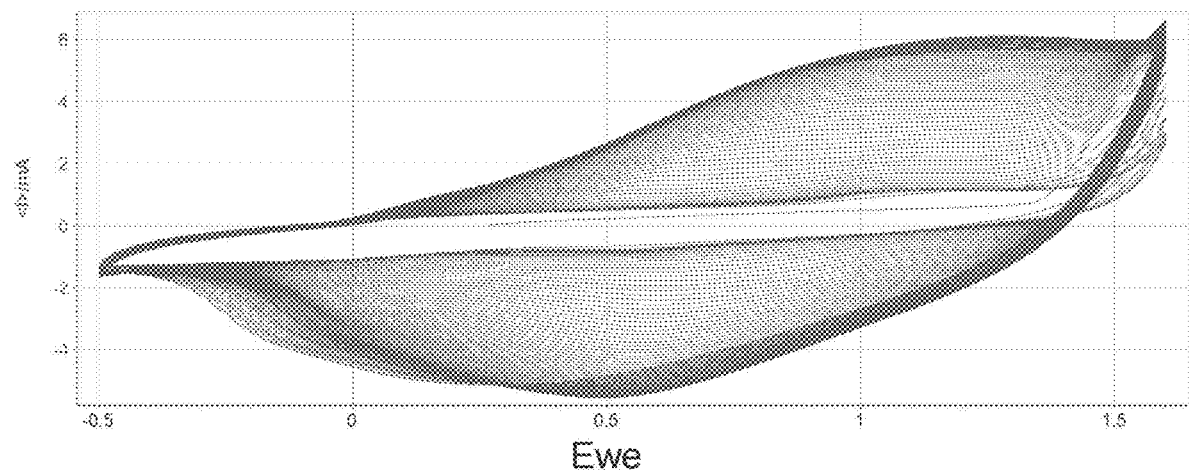
FIG. 3 shows the cyclic voltammetry curves obtained for the non-annealed carbon fibre fabric during P3MT polymerisation.

This synthesis can use the devices illustrated in FIGS. 1 to 3 of international application WO 2015/071408 [9]. It can also be carried out using a modified device with respect to the device represented schematically in FIG. 15 of international application WO 2009/050247 [8].

The modified device adapted for vertical configuration synthesis is composed, like the device represented schematically in FIG. 15 of international application WO 2009/050247 [8] (the references hereinafter correspond to the references used in this Figure), of three parts:

1) an injection system comprising at least one tank fluidically connected to at least one injector and typically two tanks R1 and R2 fluidically connected to two injectors IN1 and IN2 and for injecting the liquid precursor solutions into the evaporator EV in the form of fine droplets, the latter vaporising the fine droplets previously formed;

2) a reactor (or reaction chamber) CR wherein the substrate made of porous carbonaceous material is located typically disposed and held on a substrate-holder such as a stainless steel substrate-holder and wherein the carrier gas stream transports the reactive precursor vapour. This reactor is placed in a tubular or square cross-section furnace FO; and 3) a cooling and trapping system SO for processing the gases at the furnace outlet before extraction.

However, the modified device adapted for vertical configuration synthesis differs from the device represented schematically in FIG. 15 of international application WO 2009/050247 [8] by the following two elements:

the evaporator EV is fluidically connected at the upper part of the reactor CR and no longer at the upstream part (i.e. of the inlet) of the reactor whereby the fine droplets are injected along an essentially perpendicular direction (i.e. 90°±30°), advantageously perpendicular to the plane of the substrate;

the pressure in the reactor at which the second step of the method i.e. the deposition of the VACNTs is carried out is less than 800 mbar and no longer at atmospheric pressure.

Protocol

As explained above, the VACNT synthesis in the vertical configuration includes the 2 steps taking place in the same reactor as defined for the case of a horizontal configuration synthesis. The conditions of this synthesis are summarised in Table 2 hereinafter.

TABLE 2

VACNT synthesis parameters on carbon fibre fabrics (injection in vertical configuration)

| | Injection of Anhydrous toluene/TEOS | Injection of Toluene/ Ferrocene (5%) |
| --- | --- | --- |
| Synthesis temperature (° C.) | 850 | 850 |
| Argon flow rate (L/min) | 5 | 3 |
| Pressure (mbar) | 400 | 400 |
| Mass of liquid injected (g/h) | 40 | 70 |
| Concentration in precursor mixture | 1 mol/L of TEOS | 5 wt % of Ferrocene |
| Injection time (s) | 1200 | 1500 |

Result

FIGS. 2A, 2B and 2C show SEM images of carbon fibre fabrics coated with nanotubes and obtain in the vertical configuration (FIG. 2C), a comparison with the samples obtained in the horizontal configuration (FIGS. 2A and 2B) is also present in these images. Thus, it is obvious that growth in the horizontal configuration gives rise to VACNT formation preferentially on the fibres present on the surface of the fabric, whereas in the vertical configuration and in conjunction with a lowering of the working pressure in the reactor, the aligned nanotubes are formed both on the fibres on the fabric surface but also on the fibres in the fabric thickness. Thus, the method in the vertical configuration thereof and applying a lower working pressure than the atmospheric pressure makes it possible to achieve VACNT growth in the body of the fibrous preform.

II. Electrodeposition of P3MT and Evaluation of the Capacitance of the Electrodes Produced.

The purpose of the following four examples is to show the benefit of the presence of nanotube sheets on the surface and in the body of carbon fibre fabrics. In other words, it involves demonstrating the benefit of the nanostructuring on the surface and in the body of carbon fibre fabrics on the deposition of the conducting polymer and the capacitance developed by the electrodes thus produced.

For this, all the tests were conducted at a constant charge quantity, namely 2 C, in order to be able to compare the different configurations in terms of capacitance values obtained.

II.1. Electrodeposition of P3MT on Crude Carbon Fibre Fabric and Evaluation of Capacitance (Comparative Example).

Here, this involves estimating the possibility of depositing conducting polymer on the surface of synthetic crude fibre fabrics, i.e. fibres coated with an organic sizing layer, required for handling carbon fibre fabrics and well known in the aeronautical sector.

The sample of crude carbon fibres underwent a cyclic voltammetry electrodeposition (−0.5 V to 1.6 V at 20 mV·s$^{-1}$, in an equal volume mixture of EMI-TFSI/CH$_3$CN containing 0.4 M of 3-methylthiophene monomer). In order to attain a charge quantity (Qp) of 2 C, 100 polymerisation cycles were applied, but it proved to be difficult to attain the charge of 2 C envisaged, with the charge quantity reaching an upper limit of 1.75 C (FIG. 3). This is explained by a pronounced resistive effect of the fabric and by a surface area developed by the fabric which remains limited.

II.2. Electrodeposition of P3MT on Fabric of Crude Carbon Fibres Annealed and Coated with SiOx and Evaluation of Capacitance (Comparative Example).

For this test, the carbon fibres were annealed in an argon stream at 3 L·min$^{-1}$ and at 850° C. then were coated with SiOx according to the first step of the method according to the invention (see Table 2).

In this case, P3MT deposition proved to be impossible due to overly resistive behaviour explained by the presence of an insulating SiOx film on the surface of the fibres.

II.3. Electrodeposition of P3MT on VACNTs Distributed Essentially on the Fibres Disposed on the Surface of the Carbon Fibre Fabric and Evaluation of Capacitance (Comparative Example).

On this sample, the VACNTs are mainly distributed on the surface of the fibres by implementing a horizontal configuration synthesis method. Thus, the fibres in the body of the fabric do not include VACNTs and the surface thereof therefore essentially consists of a layer of SiOx. The nanostructuring of the surface of the carbon fibre fabric therefore enables a slight increase in the active surface area available for P3MT deposition, but the fibres present in the body are inactive in view of the surface area thereof coated with SiOx.

Figure 4:
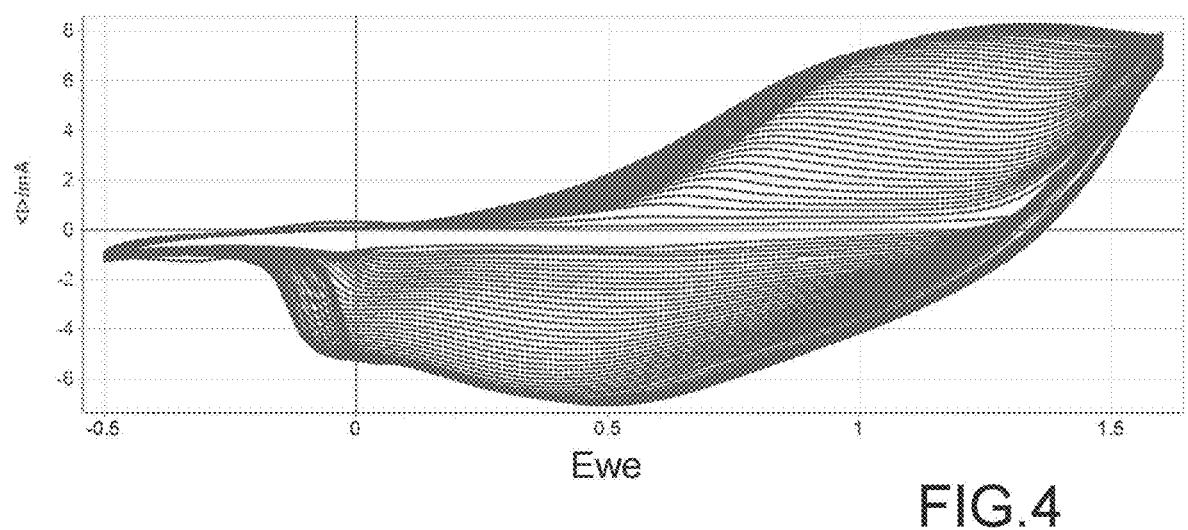
FIG. 4 shows the cyclic voltammetry curves obtained, during P3MT polymerisation, for the carbon fibre fabric provided with VACNTs essentially on the surface.

This sample of VACNTs on a carbon fibre fabric substrate underwent a cyclic voltammetry electrodeposition (−0.5 V to 1.6 V at 20 mV·s$^{-1}$, in an equal volume mixture of EMI-TFSI/CH$_3$CN containing 0.4 M of 3-methylthiophene monomer) of 38 deposition cycles to obtain a charge Qp=2.14 C (FIG. 4). P3MT deposition is then possible, but only on the carbon nanotubes present on the fabric surface fibres, the fibres coated with SiOx in the body of the fabric being too resistive to enable ECP deposition.

II.4. Electrodeposition of P3MT on VACNTs Distributed Both on the Fibres Disposed on the Surface and in the Body of the Carbon Fibre Fabric and Evaluation of Capacitance.

Figure 5:
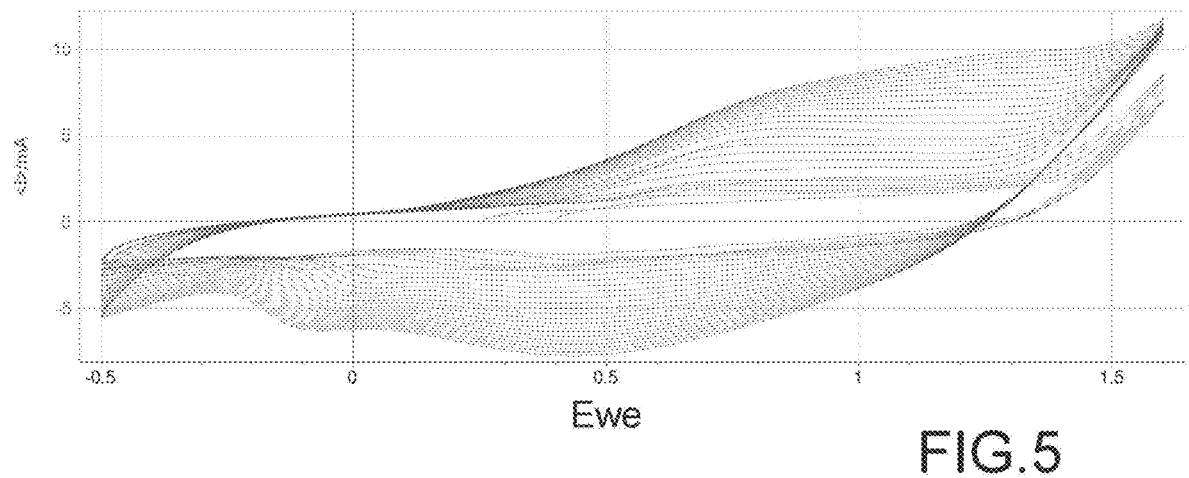
FIG. 5 shows the cyclic voltammetry curves obtained, during P3MT polymerisation, for the carbon fibre fabric provided with VACNTs on the surface and in the body.

On this sample, the VACNTs are distributed on the fibres which are located both on the surface and in the body of the carbon fibre fabric by implementing the method according to the invention. The active surface area developed by the VACNTs is therefore greater than that of the bare or SiOx-coated fibres, and most of the fibres forming the fabric are coated with VACNTs. This sample of VACNTs on a carbon fibre fabric substrate underwent a cyclic voltammetry electrodeposition (−0.5 V to 1.6 V at 20 mV·s$^{-1}$, in an equal volume mixture of EMI-TFSI/CH$_3$CN containing 0.4 M of 3-methylthiophene monomer) of 24 deposition cycles to obtain a charge Qp=2.05 C (FIG. 5). P3MT deposition is then possible, and in view of the electrochemical signal, all of the carbon nanotubes present on the surface and in the volume of the fibrous fabric appears to have been coated with P3MT.

III. Comparison According to the Different Nanotube Configurations on Carbon Fibre Fabric Substrates and the Electrochemical Conditions.

All of the results presented for different nanotube configurations on carbon fibre fabric substrates and electrochemical conditions makes it possible to establish points of comparison in terms of performances and particularly in relation to the surface capacitance.

III.1. Comparison 1: Electrodes with Only the Sheet of Nanotubes Supported on Carbon Fibre Fabric Substrates (without ECP).

As the capacitance of an electrode free from P3MT is indirectly proportional to the active surface area of the electrode, the comparison of the electrodes under the same electrochemical conditions is a good comparative indicator of the active surface areas of each type of electrode.

Thus, for the same geometric surface area of the electrode, the electrochemical characterisation was conducted in cyclic voltammetry (−0.5 V to 1.6 V at 20 mV·s$^{-1}$, in an equal volume mixture of EMI-TFSI/CH$_3$CN).

Figure 6:
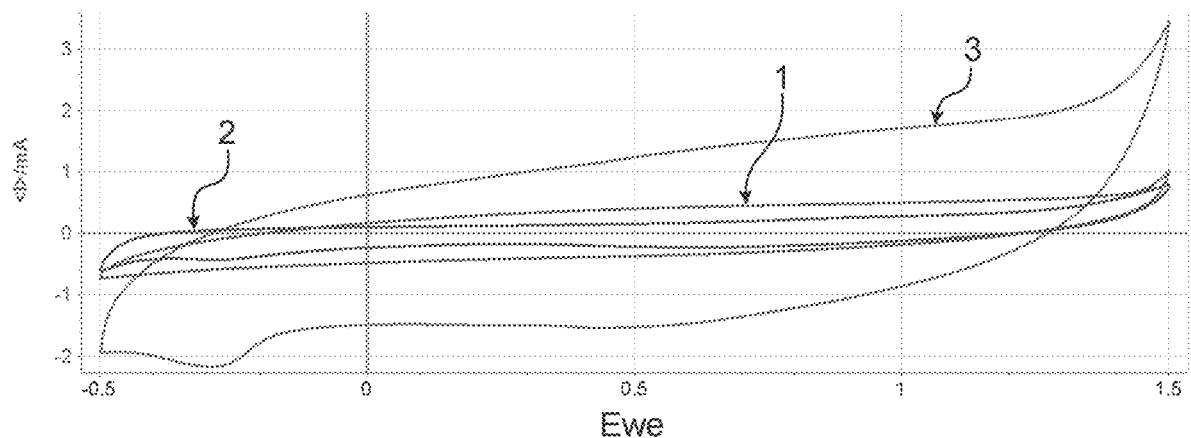
FIG. 6 shows the cyclic voltammetry curves for a non-annealed crude fibre fabric (1), a carbon fibre fabric provided with VACNTs essentially on the surface (2) and a carbon fibre fabric provided with VACNTs on the surface and in the body (3).

Table 3 below reports the discharge surface capacitances for each electrode under the same electrochemical conditions, and FIG. 6 reports the voltammograms produced under the analytical conditions.

TABLE 3

| | Csd/mF · cm−2 |
|---|---|
| Crude fibre fabric with sizing (non-annealed) | 22 |
| Fibre fabric/VACNTs (on surface) | 14 |
| Fibre fabric/VACNTs (on surface and in body) | 79 |

These results show the very pronounced effect of the presence of nanotubes in the body of the fibrous preform which is explained by an increase in the active surface area available. It is also important to note that the capacitance of the fabric containing VACNTs located only on the surface fibres is lower than that of the crude fabric. This is explained in that the fibres which are located in the body are partially coated with a SiOx resistive sublayer which blocks the electrochemical response of the oxide-coated fibre.

III.2. Comparison 2: Electrodes Composed of VACNTs Supported on Carbon Fibre Fabric Substrates and Coated with P3MT.

The P3MT deposition is carried out for the same polymerisation charge quantity (Qp ~2 C) and the storage properties of the electrodes are compared to an equivalent geometric surface area.

Figure 7:
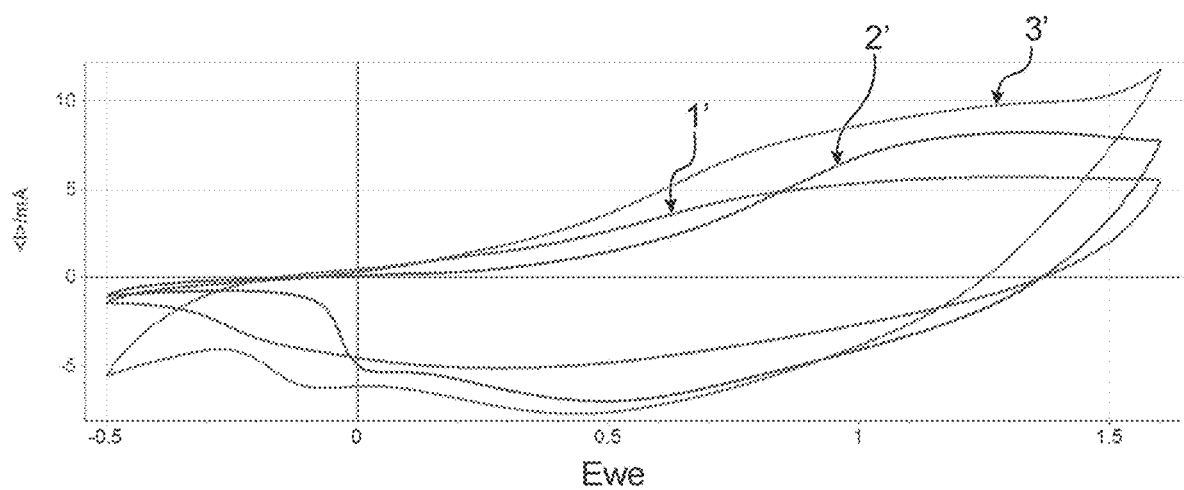
FIG. 7 shows the cyclic voltammetry curves for a non-annealed crude fibre fabric, coated with P3MT (1'), a carbon fibre fabric provided with VACNTs essentially on the surface, coated with P3MT (2') and a carbon fibre fabric provided with VACNTs on the surface and in the body, coated with P3MT (3').

Table 4 below reports the discharge surface capacitances for each electrode under the same electrochemical conditions and is based on the examples of points II.1, II.3 and II.4 as described above. FIG. 7 reports the voltammograms produced under the analytical conditions.

TABLE 4

| | P3MT electrodeposition Cyclic voltammetry −0.5 V to 1.6 V | | Surface capacitance |
|---|---|---|---|
| | Qp/C | Number of cycles | Csd/ mF · cm−2 |
| Non-annealed crude fibre fabric | 1.75 | 100 | 145 |
| Fibre fabric/VACNTs (on surface) | 2.14 | 38 | 172 |
| Fibre fabric/VACNTs (on surface and in body) | 2.05 | 24 | 241 |

For a quasi-identical polymerisation charge quantity (Qp ~2C), the electrode developing the largest active surface area (fibres/VACNTs on surface and in body) shows the highest specific capacitance, and only 24 cycles are required to obtain the charge quantity of 2 C. These results clearly show the important role important of the nanotubes located on the surface and in the body: P3MT nanostructuring via the VACNTs present on the fibres both on the surface and in the body of the fabric makes it possible to improve the performances of the carbon fibre-based electrode significantly.

Thus, a 40% increase in the capacitance of the fabric including fibres coated with VACNTs on the surface and in the body of the fibrous preform is observed compared to the preform only including surface fibres coated with VACNTs. The increase is even greater (66%) if comparing to the raw fabric with no nanotubes.

BIBLIOGRAPHIC REFERENCES

[1] Ma et al, 2016, "Asymmetric hybrid capacitors based on novel bearded carbon fiber cloth-pinhole polyaniline electrodes with excellent energy density", RSC Adv., vol. 6, pages 82995-83002.
[2] Zhao et al, 2016 "Vapor-phase polymerization of poly (3,4-ethylenedioxythiophene) nanofibers on carbon cloth as electrodes for flexible supercapacitors", Nanotechnology, vol. 27.
[3] Ye et al, 2017, "Morphology controlled $MnO_2$ electrodeposited on carbon fiber paper for high-performance supercapacitors", J. Power Sources, vol. 351, pages 51-57.
[4] Hsu et al, 2017, "High-cell-voltage supercapacitor of carbon nanotube/carbon cloth operating in neutral aqueous solution", J. Materials Science, vol. 22, pages 3383-3387.
[5] Hiremath et al, 2017, "Recent developments in carbon fibers and carbon nanotube-based fibers: a review", Polymer Reviews, vol. 57, pages 339-368.
[6] Pozegic et al, 2016, "Multi-functional carbon fibre composites using carbon nanotubes as an alternative to polymer sizing", Scientific Reports, vol. 6, Article number 37334.
[7] Lv et al, 2012, "Vertically aligned carbon nanotubes grown on carbon fabric with high rate capability for super-capacitors", Synthetic Metals, vol. 162, pages 1090-1096.
[8] International application WO 2009/103925 in the name of CEA published on 27 Aug. 2009.
[9] International application WO 2015/07148 in the name of CEA published on 21 May 2015.
[10] Li and Chen, 2017, "Polyaniline/carbon nanotubes-decorated activated carbon fiber felt as high-performance, free-standing and flexible supercapacitor electrodes", J. Mater. Sci., vol. 52, pages 12348-12357.
[11] Yesi et al, 2016, "Directly-grown hierarchical carbon nanotube polypyrrole core-shell hybrid for high-performance flexible supercapacitors", Chem Sus Chem, vol. 6, pages 370-378.
[12] Patient application CN 102354612 in the name of University of Tianjin published on 15 Feb. 2012.
[13] Patent application US 2003/077515 in the name of Chen et al published on 24 Apr. 2003.
[14] International application WO 2012/004317 in the names of CEA, Francois Rabelais University & Cergy Pontoise University published on 12 Jan. 2012.
[15] International application WO 2008/016990 in the name of Ada Technologies published on 7 Feb. 2008.

What is claimed is:

1. A method for providing a substrate made of a porous carbonaceous material with vertically aligned carbon nanotubes on a surface and in a body thereof,
   said method having a first step of depositing a ceramic sublayer on said substrate followed by a second synthesis step, by catalytic chemical vapour deposition, of said vertically aligned carbon nanotubes on the substrate obtained following the first step, to obtain a substrate having vertically aligned carbon nanotubes on the surface and in the body thereof, and wherein the vertically aligned carbon nanotubes on the surface and in the body of the substrate are vertically aligned relative to the plane of the substrate; and
   wherein a carbon source required for the synthesis during the second step is injected in a substantially perpendicular direction to the plane of the substrate and at a pressure between $3 \times 10^4$ Pa and $6 \times 10^4$ Pa.

2. The method according to claim 1, wherein said substrate made of a porous carbonaceous material is presented in the form of carbon fibres or a carbon foam.

3. The method according to claim 1, wherein said ceramic is an oxide ceramic.

4. The method according to claim 1, wherein said carbon source is co-injected with a catalytic source required for synthesis during said second step.

5. The method according to claim 1, wherein said first step and said second step are carried out in the same reaction chamber.

6. The method according to claim 1, wherein said first step and said second step are carried out respectively in a first chamber and in a second chamber.

7. A method for preparing an electrode comprising a substrate made of a porous carbonaceous material, vertically aligned carbon nanotubes on the surface and in the body thereof and an electrically conducting polymer matrix, said method comprising the following successive steps:
   a) providing a substrate made of a porous carbonaceous material with vertically aligned carbon nanotubes nanotubes on the surface and in the body thereof according to the method as defined in claim 1;

b) depositing said polymer matrix electrochemically on said carbon nanotubes using an electrolytic solution comprising at least one precursor monomer of said matrix.

8. The method according to claim 7, wherein, following said step (a) and prior to said step (b), the vertically aligned carbon nanotubes are subjected to an oxidising treatment.

9. The method according to claim 7, wherein said electrochemical deposition method is carried out using a pulsed or continuous galvanostatic method.

10. The method according to claim 7, wherein, following said step (b), the method has a rinsing step and optionally a drying step.

11. The method according to claim 7, wherein said electrochemical deposition method is carried out using a pulsed or continuous potentiostatic method.

12. The method according to claim 1, wherein said ceramic is a silicon oxide of formula $SiO_x$, where $0<x\leq2$.

13. A method for providing a substrate made of a porous carbonaceous material with vertically aligned carbon nanotubes on a surface and in a body thereof, said method having a first step of depositing a ceramic sublayer on said substrate followed by a second synthesis step, by catalytic chemical vapour deposition, of said vertically aligned carbon nanotubes on the substrate obtained following the first step, to obtain a substrate having vertically aligned carbon nanotubes on the surface and in the body thereof, and wherein the vertically aligned carbon nanotubes on the surface and in the body of the substrate are vertically aligned relative to the plane of the substrate; and wherein a carbon source required for the synthesis during the second step is injected in a substantially perpendicular direction to the plane of the substrate and at a pressure between $3.10^4$ Pa and $6.10^4$ Pa; and wherein the first step of depositing the ceramic sublayer on the substrate comprises injecting ceramic sublayer precursors on the substrate in a substantially perpendicular direction to the plane of the substrate and at a pressure between $3\times10^4$ Pa and $6\times10^4$ Pa.

* * * * *